US012627869B2

(12) United States Patent
Chen

(10) Patent No.: US 12,627,869 B2
(45) Date of Patent: May 12, 2026

(54) IMAGE CAPTURING METHOD USING A PLURALITY OF DETECTION DEVICES

(71) Applicant: InnoCare Optoelectronics Corporation, Tainan City (TW)

(72) Inventor: Yu-Heing Chen, Tainan City (TW)

(73) Assignee: InnoCare Optoelectronics Corporation, Tainan City (TW)

( * ) Notice: Subject to any disclaimer, the term of this patent is extended or adjusted under 35 U.S.C. 154(b) by 311 days.

(21) Appl. No.: 18/460,584

(22) Filed: Sep. 3, 2023

(65) Prior Publication Data

US 2024/0129606 A1 Apr. 18, 2024

(30) Foreign Application Priority Data

Oct. 18, 2022 (CN) .......................... 202211273700.9

(51) Int. Cl.
| | |
|---|---|
| *H04N 23/13* | (2023.01) |
| *H04N 23/51* | (2023.01) |
| *H04N 23/66* | (2023.01) |
| *H04N 23/80* | (2023.01) |

(52) U.S. Cl.
CPC ............. *H04N 23/13* (2023.01); *H04N 23/51* (2023.01); *H04N 23/66* (2023.01); *H04N 23/80* (2023.01)

(58) Field of Classification Search
CPC ........ H04N 23/13; H04N 23/51; H04N 23/66;

H04N 23/80; H04N 23/661; H04N 23/698; H04N 23/90; G06T 3/4038; G06T 1/20; G06T 2200/32; G06T 2207/20221
See application file for complete search history.

(56) References Cited

U.S. PATENT DOCUMENTS

| | | | | |
|---|---|---|---|---|
| 2006/0203090 A1* | 9/2006 | Wang | ............... | G08B 13/19643 |
| | | | | 348/143 |
| 2014/0226058 A1* | 8/2014 | Muraki | ................ | H04N 23/665 |
| | | | | 348/362 |
| 2014/0267748 A1* | 9/2014 | Lee | ......................... | H04N 7/181 |
| | | | | 348/159 |
| 2018/0007245 A1* | 1/2018 | Rantala | .................. | H04N 23/51 |
| 2019/0208181 A1* | 7/2019 | Rowell | ................ | H04N 9/8205 |
| 2021/0076080 A1* | 3/2021 | Yoo | ..................... | H04N 21/4854 |

* cited by examiner

*Primary Examiner* — Hung H Lam
(74) *Attorney, Agent, or Firm* — JCIPRNET

(57) ABSTRACT

The disclosure provides an image capturing method performed by applying a plurality of detection devices to perform an image capturing operation. The image capturing method includes following steps: A first detection device is provided. A second detection device is provided and connected to the first detection device. An image capturing operation is performed by the first detection device and the second detection device, so as to generate first image data and second image data, respectively. The second image data are transferred to the first detection device by the second detection device. By applying the image capturing method, costs of a detection system are not significantly increased, and the detection devices may be expanded.

16 Claims, 6 Drawing Sheets

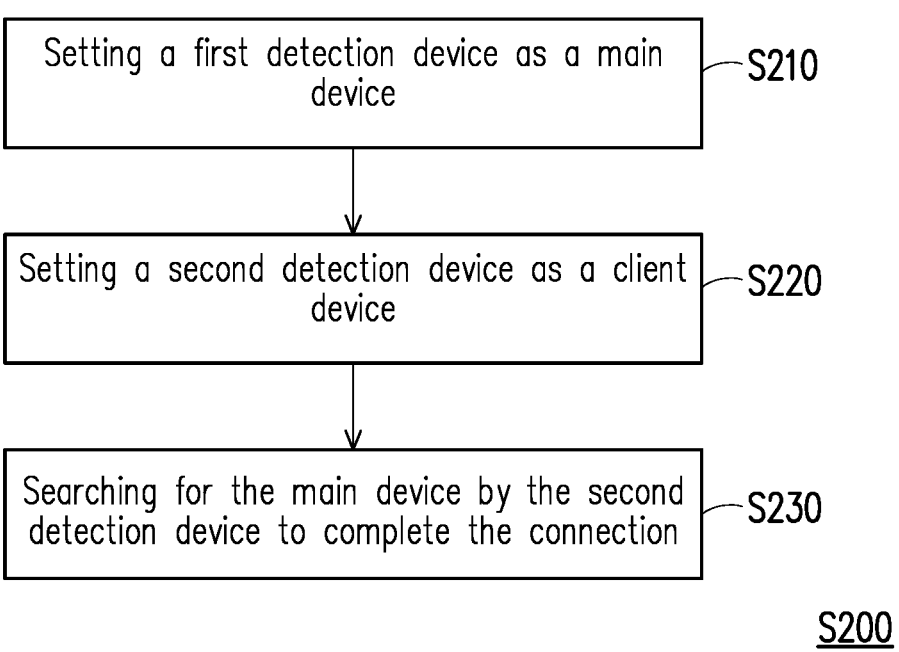

| Setting a first detection device as a main device | ～S210 |

Setting a second detection device as a client device ～S220

Searching for the main device by the second detection device to complete the connection ～S230

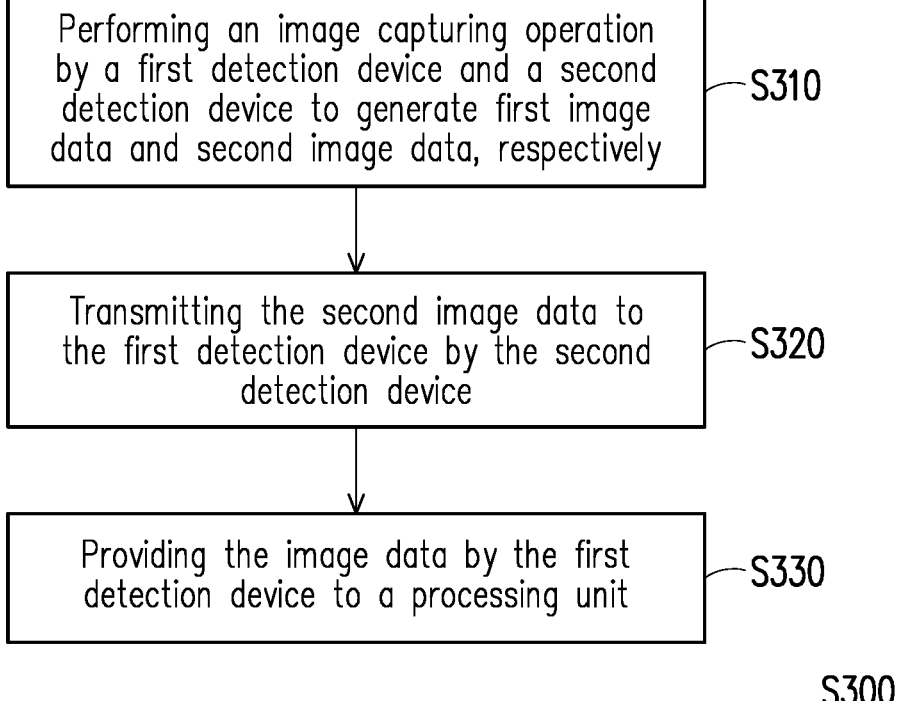

Performing an image capturing operation by a first detection device and a second detection device to generate first image data and second image data, respectively ～S310

Transmitting the second image data to the first detection device by the second detection device ～S320

Providing the image data by the first detection device to a processing unit ～S330

IMAGE CAPTURING METHOD USING A PLURALITY OF DETECTION DEVICES

CROSS-REFERENCE TO RELATED APPLICATION

This application claims the priority benefit of China application serial no. 202211273700.9, filed on Oct. 18, 2022. The entirety of the above-mentioned patent application is hereby incorporated by reference herein and made a part of this specification.

BACKGROUND

Technical Field

The disclosure relates to an image capturing method; more particularly, the disclosure relates to an image capturing method using a plurality of detection devices.

Description of Related Art

In special image capturing applications (e.g., a large-area image capturing application), a detection system performs an image capturing operation by applying a plurality of detection devices. The detection devices are respectively connected to a control unit (e.g., a computer host), respectively.

However, the existing computer host may merely connect one single detection device at a time and process image data captured by the detection device. Therefore, when a plurality of detection devices are required to capture images, an image data processing procedure performed by a processing software in the computer host is required to be changed, or a device capable of time-sharing image data processing (such as a router or a multiplexer) should be added to the computer host, so as to allow the computer host to receive a plurality of image data from the detection devices at different times. Changing the data processing procedure of the processing software or controlling the time sequence of receiving the image data from the detection devices increases the cost of the detection system.

SUMMARY

The disclosure provides an image capturing method which allows a detection system to support expansion of a plurality of detection devices in no need of complex control of received time sequences of image data.

According to an embodiment of the disclosure, an image capturing method using a plurality of detection devices to perform an image capturing operation is provided, and the image capturing method includes following steps. A first detection device is provided. A second detection device is provided and connected to the first detection device. An image capturing operation is performed by the first detection device and the second detection device, so as to generate first image data and second image data, respectively. The second image data are transferred to the first detection device by the second detection device.

In view of the above, the first detection device generates the first image data, and the second detection device generates the second image data. Besides, the second detection device transmit the second image data to the first detection device. Therefore, the first detection device may be configured to set a signal path for outputting image data to a processing unit. By applying the image capturing method, the architecture of the detection system may remain unchanged or need not be significantly modified. As such, the detection system is able to support the expansion of a plurality of detection devices, and the complexity of the received time sequences of the image data is reduced.

BRIEF DESCRIPTION OF THE DRAWINGS

The accompanying drawings, which are included to provide a further understanding of the disclosure, are incorporated in and constitute a part of this specification. The drawings illustrate embodiments of the disclosure and, together with the description, serve to explain the principles of the disclosure.

FIG. 4A is a flowchart of a setting process in an image capturing method according to an embodiment of the disclosure.

FIG. 4B is a flowchart of a data processing process in an image capturing method according to an embodiment of the disclosure.

DESCRIPTION OF THE EMBODIMENTS

Figure 1:
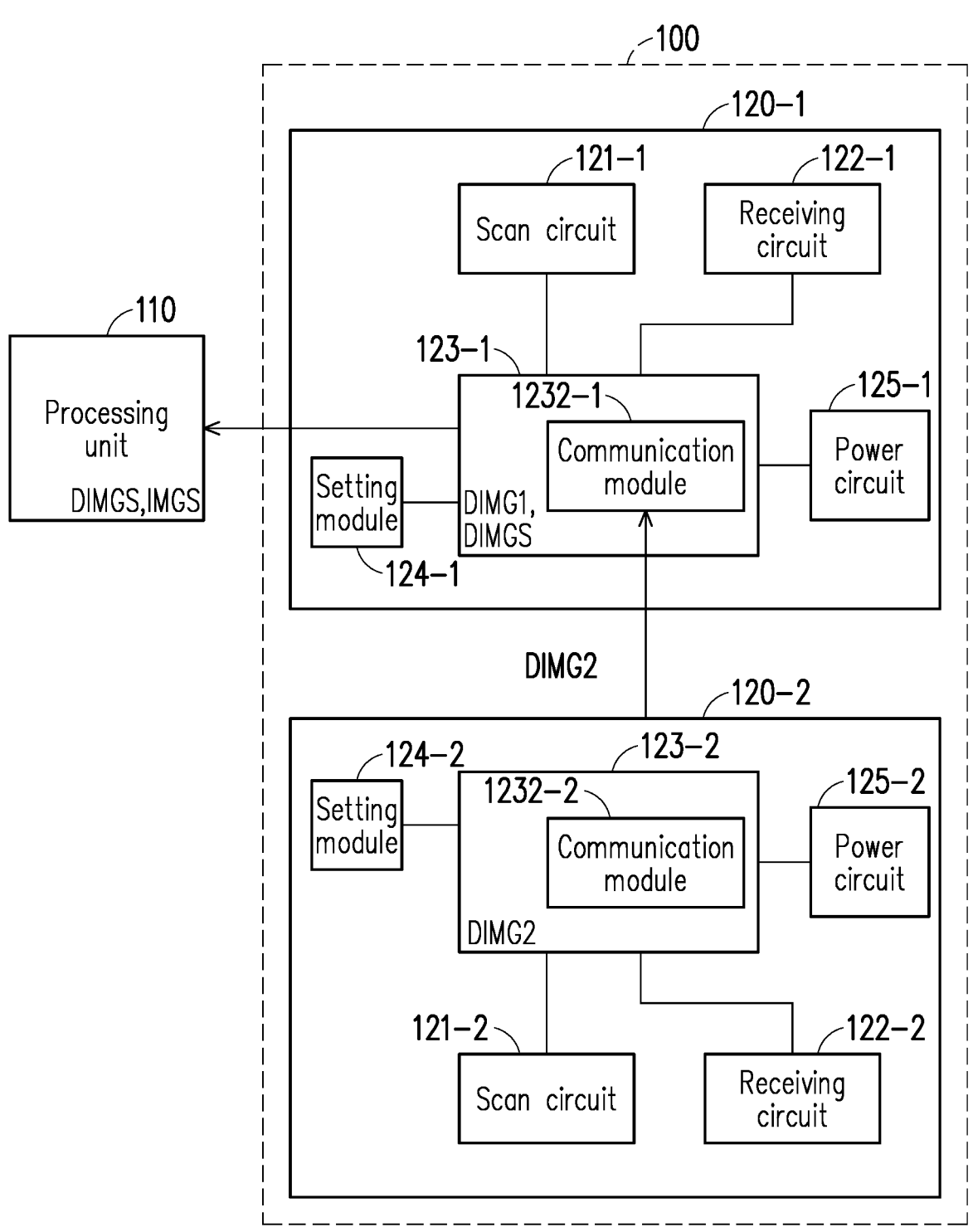
FIG. 1 is a schematic view of a detection system according to a first embodiment of the disclosure.

The disclosure will be understood by reference to the following detailed description when considered in connection with the accompanying drawings. It is to be noted that, for ease of understanding and simplicity of the drawings, some of the drawings of the disclosure only illustrate a part of an electronic device, and specific elements in the drawings are not drawn according to actual scale. In addition, the number and size of each element in the drawings are only for schematic purposes and are not intended to limit the scope of the disclosure.

Certain terminologies throughout the description and the following claims serve to refer to specific components. As will be understood by those skilled in the art, electronic device manufacturers may denote components by different names. It is not intended to distinguish the components that differ by name but not by function. In the following specification and claims, the terminologies "including," "comprising," "having," etc. are open-ended terminologies, so they should be interpreted to mean "including but not limited to . . . ". Therefore, when the terms "including," "comprising," and/or "having" are used in the description of the disclosure, the terminologies designate the presence of a corresponding feature, region, step, operation, and/or component but do not exclude the presence of one or more corresponding features, regions, steps, operations, and/or components.

It should be understood that when a component is referred to as being "coupled to," "electrically connected to," or "conducted to" another component, it can be directly connected to the another component, and electrical connection between the component and the another component may be directly established, or an intermediate component may also be present between the components for intermediate electrical connection (indirect electrical connection). By contrast, when a component is referred to as being "directly coupled to," "directly conducted to," or "directly electrically connected to" another element, no intermediate element is present. As used herein, being "connected" may refer to a direct or indirect signal communication manner for receiving and/or transmitting signals between two components or apparatuses through a connection line or in a wireless manner.

Although terminologies such as "first," "second," "third," and the like may be used to describe various elements, the elements are not limited to these terminologies. These terminologies are used only to distinguish one element from another in the specification. The same terminologies are not necessarily used in the claims as in the description and may be replaced with first, second, third and the like according to the order in which the elements are stated in the claims. Therefore, a first element in the following description may be a second element in the claims.

The electronic device provided in the disclosure may include a display device, an antenna device, a detection device, a light emitting device, a touch electronic device (e.g., a touch display), a curved electronic device (e.g., a curved display), or a free shape display, which should however not be construed as a limitation in the disclosure. The electronic device may be a bendable or flexible electronic device. The electronic device may include, for instance, liquid crystal, light emitting diode, quantum dot (QD), fluorescence, phosphor, other suitable display media, or a combination of the foregoing, which should however not be construed as a limitation in the disclosure. The light emitting diode may include, for instance, an organic light emitting diode (OLED), a sub-millimeter light emitting diode (mini LED), a micro light emitting diode (micro LED), a quantum dot light emitting diode (quantum dot LED, including QLED or QDLED), other appropriate materials, or a combination of the foregoing, which should however not be construed as a limitation in the disclosure. The antenna device may be, for instance, a liquid crystal antenna and may include an antenna splicing device, which should however not be construed as a limitation in the disclosure. It should be noted that the electronic device may be any arrangement and combination of the foregoing, which should however not be construed as a limitation in the disclosure. In addition, the appearance of the electronic device may be rectangular, circular, polygonal, in a shape with curved edges, or in other suitable shapes. The electronic device may have peripheral systems, such as a driving system, a control system, a light source system . . . and the like, so as to support a display device, an antenna device, or a splicing device, which should however not be construed as a limitation in the disclosure. The detection device may include a camera, an infrared sensor, a fingerprint sensor, an X-ray sensor, and so on, which should not be construed as a limitation in the disclosure. In some embodiments, the detection device may further include a flashlight, an infrared (IR) light source, and X-ray light source, other sensors, electronic components, or a combination of the foregoing, which should not be construed as a limitation in the disclosure.

In the disclosure, the term "pixel" or "pixel unit" used in embodiments serves as a unit for describing a specific region including at least a function circuit for performing at least one specific function. The area where a "pixel" is disposed depends on the unit configured to provide the specific function. Adjacent pixels may share the same part or conductive wires but may also contain specific parts of themselves. For instance, the adjacent pixels may share the same scan line or the same data line, while the pixel may also have its own transistor or capacitor.

Note that in the following embodiments, the technical features provided in several different embodiments may be replaced, reorganized, and mixed without departing from the spirit of the disclosure so as to complete other embodiments.

Please refer to FIG. 1, which is a schematic view of a detection system according to a first embodiment of the disclosure. In this embodiment, a detection system 100 includes a first detection device 120-1 and a second detection device 120-2. The first detection device 120-1 may be configured to generate first image data DIMG1. The second detection device 120-2 may be configured to generate second image data DIMG2. The second detection device 120-2 may be connected to the first detection device 120-1 through a connection line or in a wireless manner.

The first detection device 120-1 in the detection system 100 may be connected to a processing unit 110 through a connection line or in a wireless manner, and therefore the processing unit 110 may receive the image data transmitted by the first detection device 120-1. The processing unit 110 may be a desktop computer, a notebook computer, a tablet computer, a smart phone, a server, or another electronic device capable of performing computing functions and/or data receiving and transmission functions, or the processing unit 110 may be an electronic device displaying image data, which should however not be construed as a limitation in the disclosure.

The first detection device 120-1 includes a scan circuit 121-1, a receiving circuit 122-1, and a controller 123-1. The controller 123-1 is coupled to the scan circuit 121-1 and the receiving circuit 122-1. The controller 123-1 controls the scan circuit 121-1 to scan a detection pixel array (not shown) of the first detection device 120-1 row by row or column by column to transmit pixel data and controls the receiving circuit 122-1 to receive the pixel data row by row or column by column. In an embodiment, when the receiving circuit 122-1 finishes receiving the pixel data of the detection pixel array, the obtained pixel data refer to first image data DIMG1. The controller 123-1 further includes a communication module 1232-1. The communication module 1232-1 may be a signal transmission circuit supporting at least one wired communication protocol or a wireless communication protocol. In this embodiment, the second detection device 120-2 includes a scan circuit 121-2, a receiving circuit 122-2, and a controller 123-2. The controller 123-2 is coupled to the scan circuit 121-2 and the receiving circuit 122-2. The controller 123-2 controls the scan circuit 121-2 to scan a detection pixel array (not shown) of the second detection device 120-2 row by row or column by column to transmit pixel data and controls the receiving circuit 122-2 to receive pixel data row by row or column by column, and the received pixel data refer to second image data DIMG2. In an embodiment, when the receiving circuit 122-2 finishes receiving the pixel data of the detection pixel array, the received data are the second image data DIMG2. The controller 123-2 further includes a communication module 1232-2.

In this embodiment, for instance, the first detection device 120-1 may be connected to the communication module 1232-2 of the second detection device 120-2 through the communication module 1232-1 in a wireless communication manner or through a connection line. After the first detection device 120-1 is connected to the second detection device 120-2, the second detection device 120-2 may provide or transmit the second image data DIMG2 to the communication module 1232-1 of the first detection device 120-1 through the communication module 1232-2. In addition, the controller 123-1 of the first detection device 120-1 may be further connected to the external processing unit 110 through the communication module 1232-1 in a wireless communication manner or through a connection line. Therefore, the first image data DIMG1 and the second image data DIMG2 are transmitted to the processing unit 110 through the communication module 1232-1.

In this embodiment, the controller 123-1 of the first detection device 120-1 and the controller 123-2 of the second detection device 120-2 may be, for instance, central processing units (CPUs) or other programmable general-purpose or special-purpose microprocessors, digital signal processors (DSPs), programmable controllers, application specific integrated circuits (ASICs), programmable logic devices (PLDs), other similar devices, or a combination thereof, and these devices may load and execute computer programs.

In this embodiment, the first detection device 120-1 further includes a setting module 124-1. The setting module 124-1 is coupled to the controller 123-1. The setting module 124-1 may be operated (e.g., by a user) to set up the first detection device 120-1. For instance, the setting module 124-1 may be configured to set up a communication mode of the first detection device 120-1. The setting module 124-1 may be configured to set the first detection device 120-1 to be one of an access point (AP) mode and a client mode. When the first detection device 120-1 is set as the AP mode, the first detection device 120-1 may be set as the main device and may be connected to a plurality of other electronic devices (such as other detection devices); for instance, the first detection device may be connected to the second detection device and the processing unit, respectively. Therefore, the first detection device 120-1 may collect image data from other detection devices and communicate with the processing unit 110. When the first detection device 120-1 is set as the client mode, the first detection device 120-1 is set as the client device and is able to transmit image data to the main device. Accordingly, the first detection device 120-1 communicates with the main device and provides the first image data DIMG1 to the main device. The setting module 124-1 may be, for instance, at least one knob, at least one button, or a user interface (UI) and may be provided to the user for setting, which should however not be construed as a limitation in the disclosure.

In this embodiment, the first detection device 120-1 further includes a power circuit 125-1. The power circuit 125-1 may be configured to provide a power source for driving the scan circuit 121-1, the receiving circuit 122-1, the controller 123-1, and/or the setting module 124-1.

In this embodiment, the second detection device 120-2 may, similar to the first detection device 120-1, include a setting module 124-2 and a power circuit 125-2, and thus repetitive descriptions will not be provided hereinafter.

In this embodiment, when the first detection device 120-1 is set as the main device, the first detection device 120-1 may provide or transmit the first image data DIMG1 and the second image data DIMG2 to the processing unit 110. The processing unit 110 may stitch the received first image data DIMG1 and the received second image data DIMG2 to generate a stitched image data DIMGS. In this embodiment, the first detection device 120-1 may also stitch the first image data DIMG1 and the second image data DIMG2 to generate the stitched image data DIMGS and then provide or transmit the stitched image data DIMGS to the processing unit 110. To be specific, the controller 123-1 may stitch the first image data DIMG1 and the second image data DIMG2 to generate the stitched image data DIMGS and may provide or transmit the stitched image data DIMGS to the processing unit 110 through the communication module 1232-1. For instance, the controller 123-1 may load a computer program of the stitched image to generate the stitched image data DIMGS. The controller 123-1 may stitch and/or combine the first image data DIMG1 and the second image data DIMG2 by applying an existing stitched image data algorithm that is well known to people skilled in the pertinent art. The processing unit 110 may continuously receive the first image data DIMG1 and the second image data DIMG2 through the first detection device 120-1 or receive a stitched image data DIMGS. Hence, the processing unit 110 does not need any complex signal receiving manner based on a plurality of time sequences to receive the first image data DIMG1 from the first detection device 120-1 and receive the second image data DIMG2 from the second detection device 120-2, respectively. Accordingly, the architecture of the processing unit 110 does not require complex adjustments or modifications, and the detection system 100 may support the expansion of a plurality of detection devices in no need of adjusting the processing unit 110 to have a complex signal receiving manner. The first detection device 120-1 and/or the second detection device 120-2 may be an X-ray detection device based on medical, health check, or security check applications, which should however not be construed as a limitation in the disclosure.

Figure 2:
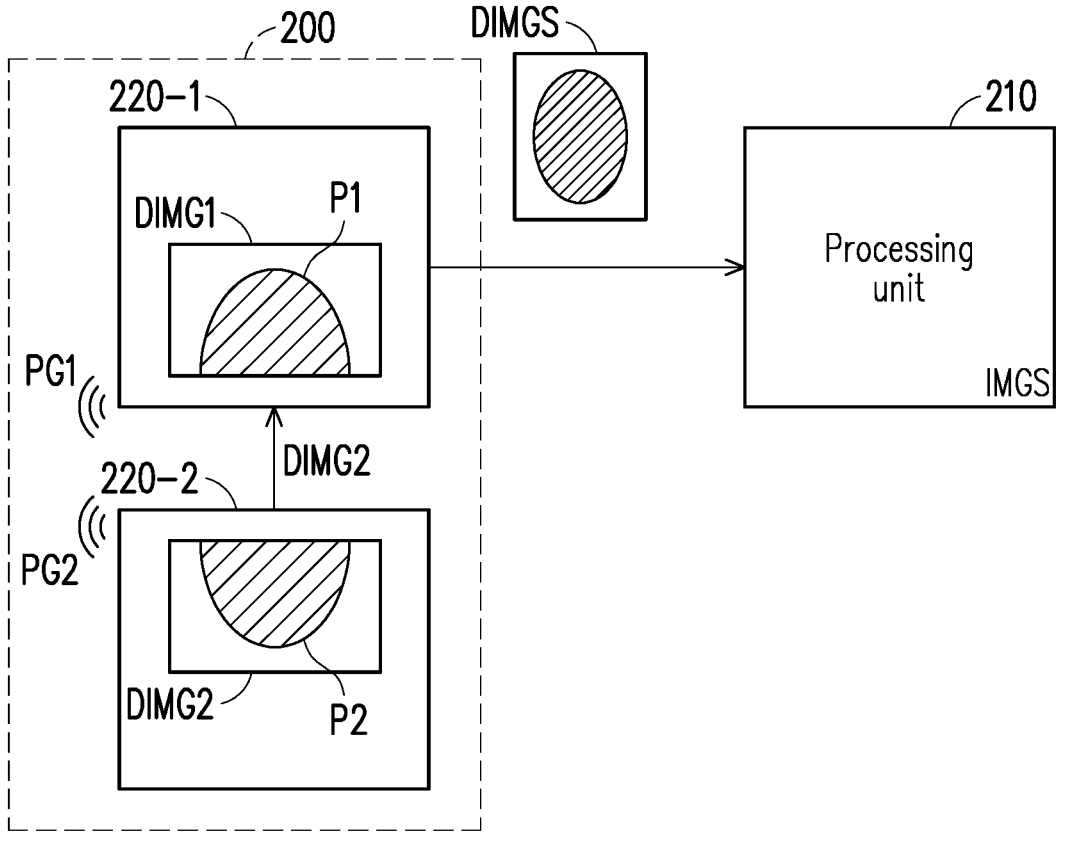
FIG. 2 is a schematic view of a detection system according to a second embodiment of the disclosure.
Figure 3:
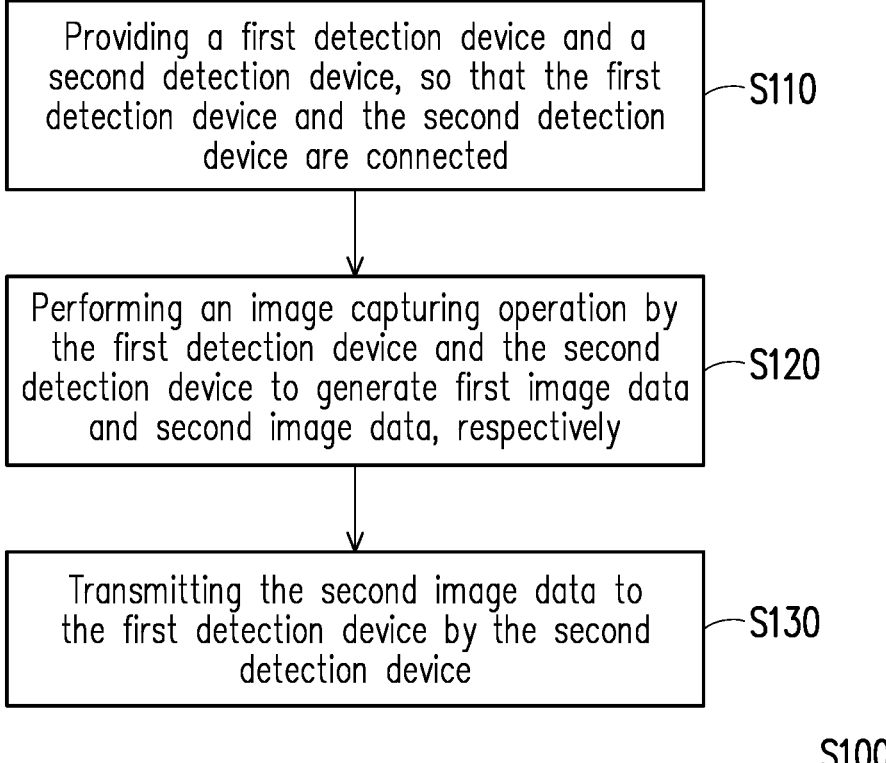
FIG. 3 is a flowchart of an image capturing method according to an embodiment of the disclosure.

Please refer to FIG. 2 and FIG. 3. FIG. 2 is a schematic view of a detection system according to a second embodiment of the disclosure. FIG. 3 is a flowchart of an image capturing method according to an embodiment of the disclosure. In this embodiment, a processing unit 210 is connected to a detection system 200, and the detection system 200 includes a first detection device 220-1 and a second detection device 220-2. The teachings of the design of the first detection device 220-1 and the second detection device 220-2 may be referred to as those provided in the embodiment shown in FIG. 1 and thus will not be repeatedly described hereinafter. In this embodiment, an image capturing method S100 is adapted to the detection system 200. In step S110, the first detection device 220-1 and the second detection device 220-2 are provided. In addition, the first detection device 220-1 and the second detection device 220-2 are connected in step S110. In step S120, the first detection device 220-1 and the second detection device 220-2 perform an image capturing operation to generate first image data DIMG1 and second image data DIMG2, respectively. In this embodiment, the first detection device 220-1 captures an image in step S120 to generate the first image data DIMG1. The second detection device 220-2 captures an image in step S120 to generate the second image data DIMG2. In step S130, the second detection device 220-2 transmits the second image data DIMG2 to the first detection device 220-1.

In step S110, a method of connecting the first detection device 220-1 and the second detection device 220-2 is set in step S110. According to this embodiment, for instance, the first detection device 220-1 is set as the main device. The second detection device 220-2 is set as the client device. Therefore, the second detection device 220-2 transmits the second image data DIMG2 generated in step S130 to the first detection device 220-1. The first detection device 220-1 collects the first image data DIMG1 generated by the first detection device 220-1 itself and the second image data DIMG2 from the second detection device 220-2.

It should be noted that the first detection device 220-1 is able to stitch the first image data DIMG1 and the second image data DIMG2 to generate the stitched image data DIMGS and provide the stitched image data DIMGS to the processing unit 210. The first detection device 220-1 may serve as a signal path for outputting image data (i.e., the first image data DIMG1 and the second image data DIMG2) to the processing unit 210. Based on the image capturing method, the architecture of the detection system 200 may stay unchanged without modification. When the expansion of a plurality of detection devices is to be supported, the processing unit 210 does not need to apply a complex signal receiving method in a plurality of time sequences to receive the first image data DIMG1 and the second image data DIMG2.

For the convenience of explanation, the first detection device 220-1 and the second detection device 220-2 are exemplarily provided in this embodiment, which should however not be construed as a limitation in the disclosure. The number of the detection device provided herein may be plural, e.g., greater than or equal to three.

In this embodiment, in step S120, the first detection device 220-1 and the second detection device 220-2 may simultaneously perform the image capturing operation. Large-area X-ray imaging for medical use or health check is taken as an example; here, the first detection device 220-1 and the second detection device 220-2 may simultaneously perform the image capturing operation under one single X-ray radiation. Hence, the detection system 200 may obtain a large-area X-ray image of a detected subject under one single X-ray radiation (i.e., corresponding to stitched image data DIMGS). The detected subject does not need to undergo multiple X-ray radiations, and therefore the radiation dosage of the X-ray received by the subject is reduced.

Please refer to FIG. 2 and FIG. 4A at the same time. FIG. 4A is a flowchart of a setting process in an image capturing method according to an embodiment of the disclosure. In this embodiment, a setting process S200 is adapted to the detection system 200. In step S210, the first detection device 220-1 is set as the main device. For instance, the first detection device 220-1 may be set as the main device by referring to the settings of the setting module 124-1 in the first detection device 120-1 shown in FIG. 1. In addition, for instance, the first detection device 220-1 may be connected to the processing unit 210 firstly in a wireless manner or through a connection line. Hence, the first detection device 220-1 may be actively set as the main device according to the established connection between the first detection device 220-1 and the processing unit 210. In addition, when the first detection device 220-1 is set as the main device, the first detection device 220-1 emits a first wireless signal PG1.

In step S220, the second detection device 220-2 is set as the client device. For instance, the second detection device 220-2 may be set as the client device by referring to the settings of the setting module 124-2 in the second detection device 120-2 shown in FIG. 1.

In step S230, the second detection device 220-2 set as the client device searches for and finds the main device to complete the connection to the main device. In this embodiment, the second detection device 220-2 receives a wireless signal from the main device. When the second detection device 220-2 receives the first wireless signal PG1 from the first detection device 220-1, the second detection device 220-2 searches for and finds the first detection device 220-1 set as the main device and completes the settings of receiving the first wireless signal PG1 in the second detection device 220-2. After the setting process is completed, the second detection device 220-2 emits a second wireless signal PG2 to be transmitted back to the first detection device 220-1, and the first detection device 220-1 may receive the second wireless signal PG2. As such, the first detection device 220-1 may be connected to the second detection device 220-2 according to the second wireless signal PG2. The first wireless signal PG1 and the second wireless signal PG2 are broadcast packets, respectively.

Please refer to FIG. 2 and FIG. 4B at the same time. FIG. 4B is a flowchart of a data processing process in an image capturing method according to an embodiment of the disclosure. In this embodiment, a data processing process S300 is adapted to the detection system 200. In step S310, the first detection device 220-1 and the second detection device 220-2 perform an image capturing operation to generate the first image data DIMG1 and the second image data DIMG2, respectively. The first detection device 220-1 performs an image capturing operation on a first part P1 of a to-be-detected object to generate the first image data DIMG1. The second detection device 220-2 an image capturing operation on a second part P2 of the to-be-detected object to generate the second image data DIMG2.

In step S320, the second detection device 220-2 transmits the second image data DIMG2 to the first detection device 220-1. Specifically, the second detection device 220-2 set as the client device transmits the second image data DIMG2 to the first detection device 220-1 set as the main device. In step S330, the first detection device 220-1 provides the image data to the processing unit 210.

In this embodiment, the first detection device 220-1 first stitches and/or combines the first image data DIMG1 and the second image data DIMG2 to generate the stitched image data DIMGS. The first detection device 220-1 provides the stitched image data DIMGS to the processing unit 210 in step S330. Next, the processing unit 210 displays a stitched image IMGS according to the stitched image data DIMGS. The first image data DIMG1 includes the image data corresponding to the first part P1 of the to-be-detected object. The second image data DIMG2 includes the image data corresponding to the second part P2 of the to-be-detected object. Hence, the stitched image IMGS is an image that shows the to-be-detected object including the first part P1 and the second part P2.

In this embodiment, the first image data DIMG1 include an image data signal of the first part P1, image size information of the first part P1, and/or a resolution of the first part P1, which should however not be construed as a limitation in the disclosure. For instance, the first image data DIMG1 include a header signal and/or a tail signal configured to record the image size information of the first part P1 and the resolution of the first part P1. The second image data DIMG2 includes an image data signal of the second part P2, image size information of the second part P2 and/or a resolution of the second part P2, which should however not be construed as a limitation in the disclosure. For instance, the second image data DIMG2 include a header signal and/or a tail signal configured to record the image size information of the second part P2 and the resolution of the second part P2. The first part P1 and the second part P2 respectively correspond to different images of the to-be-detected object at different locations. In an embodiment, the first detection device 220-1 may learn an image display specification (e.g., the image size and the display resolution that the processing unit 210 can support) from a process of connecting the first detection device 220-1 to the processing unit 210. Hence, the first detection device 220-1 may, according to at least one of the image size information of the first part P1, the resolution of the first part P1, the image size information of the second part P2, and the resolution of the second part P2, adjust the image size and/or resolution of the stitched image data DIMGS. Thereby, the stitched image data DIMGS conform to the image display specification that may be supported by the processing unit 210.

In some embodiments, the second detection device 220-2 may be set as the main device. The first detection device 220-1 may be set as the client device. Hence, in step S320, the first detection device 220-1 transmits the first image data DIMG1 to the second detection device 220-2. In step S330, the second detection device 220-2 may provide the image data to the processing unit 210. The second detection device 220-2 may stitch the first image data DIMG1 and the second image data DIMG2 to generate the stitched image data DIMGS and transmit the stitched image data DIMGS to the processing unit 210 in step S330.

Figure 5:
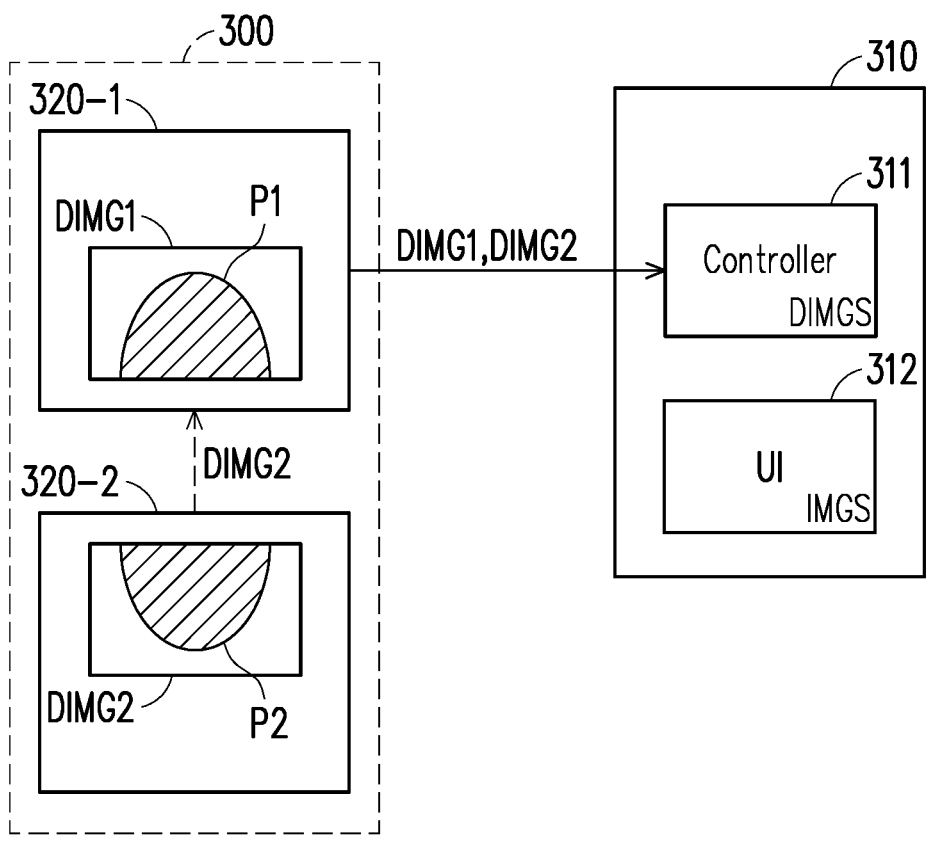
FIG. 5 is a schematic view of a detection system according to a third embodiment of the disclosure.

Please refer to FIG. 5, which is a schematic view of a detection system according to a third embodiment of the disclosure. In this embodiment, a processing unit 310 is connected to a detection device 300, and the detection system 300 includes a first detection device 320-1 and a second detection device 320-2. The teachings of the design of the first detection device 320-1 and the second detection device 320-2 may be referred to as those provided in the embodiment shown in FIG. 1 and thus will not be repeatedly described hereinafter. In this embodiment, the second detection device 320-2 is connected to the first detection device 320-1 in a wireless communication manner.

The first detection device 320-1 performs an image capturing operation to generate the first image data DIMG1. The second detection device 320-2 performs an image capturing operation to generate the second image data DIMG2. The second detection device 320-2 transmits the second image data DIMG2 to the first detection device 320-1 in a wireless communication manner. After receiving the second image data DIMG2, the first detection device 320-1 transmits the first image data DIMG1 and the second image data DIMG2 to the processing unit 310.

The processing unit 310 receives the first image data DIMG1 and the second image data DIMG2, and stitches the first image data DIMG1 and the second image data DIMG2 to generate the stitched image data DIMGS. In addition, the processing unit 310 may also display the stitched image IMGS according to the stitched image data DIMGS.

In the present embodiment, for instance, the processing unit 310 may include a controller 311. The controller 311 may stitch and/or combine the first image data DIMG1 and the second image data DIMG2 to generate the stitched image data DIMGS. For instance, the controller 311 stitches and/or combines the first image data DIMG1 and the second image data DIMG2 to generate the stitched image data DIMGS by applying a software development kit (SDK). The controller 311 may stitch and/or combine the first image data DIMG1 and the second image data DIMG2 by applying an existing stitching algorithm well known to those skilled in the pertinent art. In addition, the processing unit 310 may display the stitched image IMGS through a UI 312 according to the stitched image data DIMGS, which should however not be construed as a limitation in the disclosure.

Figure 6:
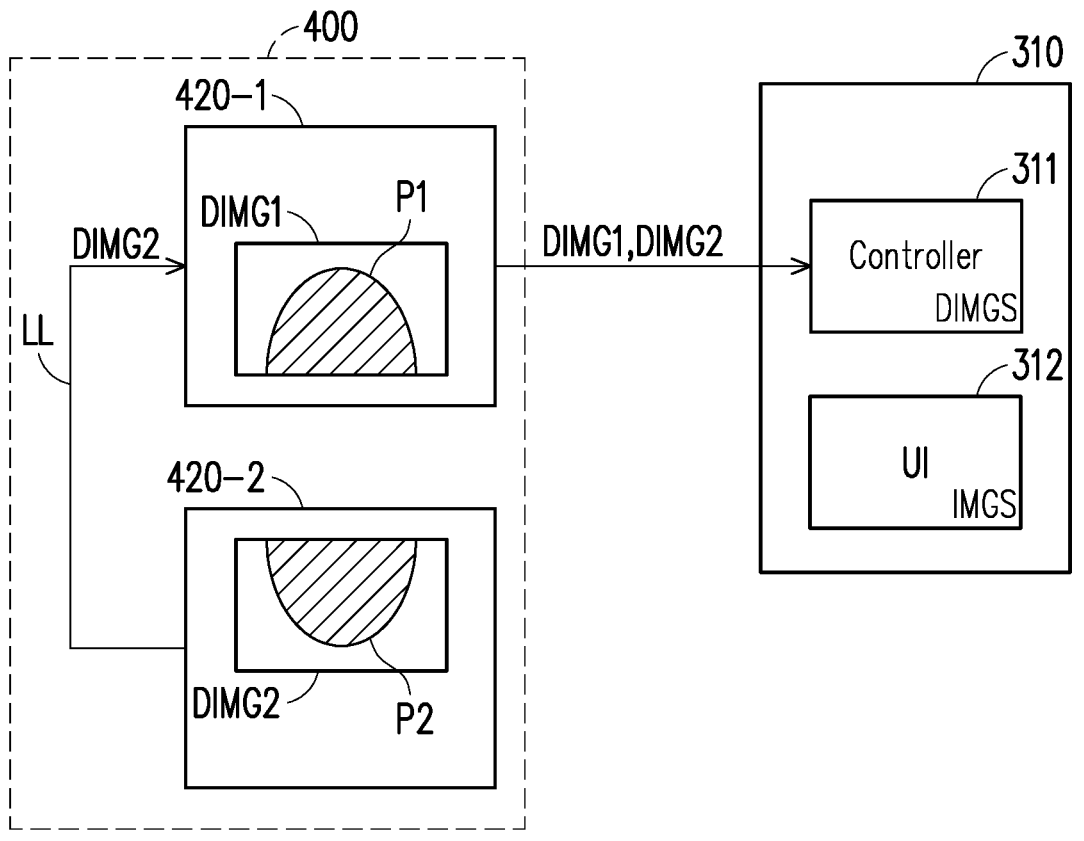
FIG. 6 is a schematic view of a detection system according to a fourth embodiment of the disclosure.

Please refer to FIG. 6, which is a schematic view of a detection system according to a fourth embodiment of the disclosure. In this embodiment, the processing unit 310 may be connected to a detection device 400. The detection system 400 includes a first detection device 420-1 and a second detection device 420-2. The teachings of the design of the first detection device 420-1 and the second detection device 420-2 may be referred to as those provided in the embodiment shown in FIG. 1 and thus will not be repeatedly described hereinafter. The teachings of the design of the processing unit 310 may be referred to as those provided in the embodiment shown in FIG. 5 and thus will not be repeatedly described hereinafter. In this embodiment, the second detection device 420-2 is connected to the first detection device 420-1 through a connection line.

In this embodiment, the second detection device 420-2 is connected to the first detection device 420-1 through a connection line LL. In this embodiment, one end of the connection line LL is coupled to the first detection device 420-1, and the other end of the connection line LL is coupled to the second detection device 420-2. Therefore, the second detection device 420-2 may be connected to the first detection device 420-1 through the connection line LL. For instance, the connection line LL may be a network cable of any specification or a bus of any version. One end of the connection line LL may be connected to a connection port of a communication module (e.g., the communication module 1232-1 shown in FIG. 1) of the first detection device 420-1. The other end of the connection line LL may be connected to a connection port of a communication module (e.g., the communication module 1232-2 shown in FIG. 1) of the second detection device 420-2.

In addition, the first detection device 420-1 performs an image capturing operation to generate the first image data DIMG1. The second detection device 420-2 performs an image capturing operation to generate the second image data DIMG2. The second detection device 420-2 transmits the second image data DIMG2 to the first detection device 420-1 through the connection line LL. After receiving the second image data DIMG2, the first detection device 420-1 transmits the first image data DIMG1 and the second image data DIMG2 to the processing unit 310. The processing unit 310 stitches and/or combines the first image data DIMG1 and the second image data DIMG2 to generate the stitched image data DIMGS and displays the stitched image IMGS according to the stitched image data DIMGS.

To sum up, in the image capturing method provided in one or more embodiments of the disclosure, the first detection device provides and/or transmits the image data (such as the first image data or the stitched image data) generated by the first detection device and/or the received image data (such as the second image data) to the processing unit. Thereby, based on the image capturing method, the detection system may support the expansion of a plurality of detection devices without significantly modifying the architecture of the processing unit, thereby reducing the cost. It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An image capturing method using a plurality of detection devices, comprising:

providing a first detection device;

providing a second detection device connected to the first detection device;

performing the image capturing operation on a first part of a to-be-detected object by the first detection device to generate the first image data, wherein the first image data comprise at least one of an image data signal of the first part, image size information of the first part, and a resolution of the first part;

performing the image capturing operation on a second part of the to-be-detected object by the second detection device to generate the second image data, wherein the second image data comprise at least one of an image data signal of the second part, image size information of the second part, and a resolution of the second part; transmitting the second image data to the first detection device by the second detection device; providing a processing device; and obtaining an image display specification supported by the processing device from a process of connecting the first detection device to the processing device.

2. The image capturing method according to claim 1, further comprising:

emitting a first wireless signal by the first detection device; and receiving the first wireless signal by the second detection device and transmitting a second wireless signal back to the first detection device, so that the second detection device is connected to the first detection device.

3. The image capturing method according to claim 2, wherein the first wireless signal and the second wireless signal are broadcast packets, respectively.

4. The image capturing method according to claim 1, further comprising:

provide a connection line, wherein one end of the connection line is coupled to the first detection device, the other end of the connection line is coupled to the second detection device, and the second detection device is connected to the first detection device through the connection line.

5. The image capturing method according to claim 4, wherein the connection line is a network cable.

6. The image capturing method according to claim 1, further comprising:

stitching the first image data and the second image data by the first detection device to generate a stitched image data.

7. The image capturing method according to claim 1, further comprising:

performing the image capturing operation simultaneously by the first detection device and the second detection device.

8. The image capturing method according to claim 1, further comprising:

setting the first detection device as a main device; and stitching the first image data and the second image data by the first detection device to generate a stitched image data.

9. The image capturing method according to claim 8, wherein the step of setting the first detection device as the main device comprises:

connecting the first detection device to the processing device to set the first detection device as the main device.

10. The image capturing method according to claim 9, further comprising:

receiving the stitched image data from the first detection device by the processing device.

11. The image capturing method according to claim 1, further comprising:

connecting the processing device to the first detection device, and receiving the first image data and the second image data; and stitching the first image data and the second image data by the processing device to generate a stitched image data.

12. The image capturing method according to claim 11, further comprising:

displaying a stitched image by the processing device according to the stitched image data.

13. The image capturing method according to claim 1, further comprising:

setting a setting module of the first detection device, so as to set the first detection device as one of a main device and a client device.

14. The image capturing method according to claim 13, wherein the setting module is one of at least one knob, at least one button, and a user interface.

15. The image capturing method according to claim 1, wherein the first part and the second part respectively correspond to different images of the to-be-detected object at different locations.

16. The image capturing method according to claim 1, further comprising:

stitching the first image data and the second image data by the first detection device to generate a stitched image data; and adjusting, by the first detection device, at least one of an image size of the stitched image data and a resolution of the stitched image data according to at least one of the image size information of the first part, the resolution of the first part, the image size information of the second part, and the resolution of the second part, so that the stitched image data conform to the image display specification supported by the processing device.

* * * * *